(12) United States Patent
de Foras et al.

(10) Patent No.: US 10,506,163 B2
(45) Date of Patent: Dec. 10, 2019

(54) SYSTEMS AND METHODS FOR SYNCHRONIZING SENSOR DATA

(71) Applicant: MOVEA, Grenoble (FR)

(72) Inventors: Etienne de Foras, Saint Nazaire les Eymes (FR); Daniela Hall, Eybens (FR)

(73) Assignee: InvenSense, Inc., San Jose, CA (US)

(*) Notice: Subject to any disclaimer, the term of this patent is extended or adjusted under 35 U.S.C. 154(b) by 0 days.

(21) Appl. No.: 15/179,291

(22) Filed: Jun. 10, 2016

(65) Prior Publication Data

US 2017/0359518 A1 Dec. 14, 2017

(51) Int. Cl.
| | |
|---|---|
| *H04N 5/232* | (2006.01) |
| *H04N 5/04* | (2006.01) |
| *H04W 56/00* | (2009.01) |
| *G02B 27/64* | (2006.01) |

(52) U.S. Cl.
CPC .......... *H04N 5/23287* (2013.01); *H04N 5/04* (2013.01); *H04N 5/23258* (2013.01)

(58) Field of Classification Search
CPC . H04N 5/23248–2329; H04N 5/23287; H04N 5/23258; H04N 5/04; G03B 2205/0007–0038; G03B 2207/005; G03B 2217/005; G02B 27/646; H04W 56/001
USPC ............... 348/220.1, 208.99–208.16, 219.1, 348/154–155, 208.1, 699; 396/13, 52–55; 359/225–557; 382/107; 375/240.16, 375/240.1, 145, 149, 240.28, 354–370, 375/240.29, 343, 350, 210.1, 144; 702/89, 187; 370/241, 248, 304, 324, 370/350, 395.62, 503, 310, 507, 509
See application file for complete search history.

(56) References Cited

U.S. PATENT DOCUMENTS

| | | | |
|---|---|---|---|
| 6,930,708 B1* | 8/2005 | Sato .................. | H04N 5/23248 348/208.12 |
| 9,602,725 B2* | 3/2017 | Mantzel ............ | H04N 5/23248 348/208.2 |
| 2006/0291841 A1* | 12/2006 | Fukumoto ............... | G03B 5/00 396/55 |
| 2008/0166115 A1* | 7/2008 | Sachs ..................... | G03B 17/00 396/55 |
| 2009/0160957 A1* | 6/2009 | Deng ................. | H04N 5/23248 348/208.99 |
| 2009/0309984 A1* | 12/2009 | Bourgain .......... | H04N 5/23248 348/208.4 |
| 2013/0044228 A1* | 2/2013 | Corey ................ | H04N 5/23254 348/208.2 |

(Continued)

*Primary Examiner* — Marly S Camargo
(74) *Attorney, Agent, or Firm* — Bay Area Technology Law Group PC

(57) ABSTRACT

A method for synchronizing data provided by an image sensor and a motion sensor rigidly linked together, comprising the steps of:
  obtaining image sensor data and motion sensor data;
  processing at least one of the image sensor data and the motion sensor data;
  extracting motion characteristics from filtering said processed data, wherein said filtering comprises at least applying a high pass filter; and
synchronizing the image sensor data and the motion sensor data provided by the rigidly linked sensors using synchronization data derived from identification of substantially similar motion characteristics in the filtered image sensor data and the filtered motion sensor data.

16 Claims, 2 Drawing Sheets

(56) References Cited

U.S. PATENT DOCUMENTS

| | | | |
|---|---|---|---|
| 2013/0044230 A1* | 2/2013 | Zhou | H04N 5/2329 348/208.6 |
| 2013/0093906 A1* | 4/2013 | Carlsson | H04N 5/23258 348/208.99 |
| 2016/0103002 A1* | 4/2016 | Milota | G01D 18/008 702/89 |
| 2016/0341579 A1* | 11/2016 | Kimura | G01D 18/008 702/89 |
| 2017/0024899 A1* | 1/2017 | Hammond | G06T 7/2033 382/103 |
| 2017/0332018 A1* | 11/2017 | Bell | H04N 5/23274 348/208.1 |
| 2019/0132519 A1* | 5/2019 | Ozluturk | H04N 5/23248 348/208.99 |

* cited by examiner

SYSTEMS AND METHODS FOR SYNCHRONIZING SENSOR DATA

FIELD OF THE PRESENT DISCLOSURE

This disclosure generally relates to techniques for synchronizing sensor data and may be applied for synchronization of image sensor data and motion sensor data for the purpose of stabilizing video frames.

BACKGROUND

Advances in technology have enabled the introduction of mobile devices that feature an ever increasing set of capabilities. Smartphones, for example, now offer sophisticated computing and sensing resources together with expanded communication functionality. Likewise, tablets, wearables, media players and other similar devices have shared in this progress. Notably, it is desirable and increasingly common to provide a mobile device with digital imaging functions. However, implementations in a mobile device may be particularly susceptible to degradation in quality caused by motion while the video is being recorded. In particular, a camera incorporated into a mobile device is often hand held during use and, despite efforts to be still during image recording, shaking may occur. Since such mobile devices may also be equipped with motion sensing capabilities, techniques exist for using inertial sensor data to improve the quality of images captured using the mobile device to address this issue. For example, video being recorded by the mobile device may be stabilized or otherwise compensated using detected motion.

The video stabilization requires that the image sensor data and the inertial or motion sensor data are perfectly synchronized. However, most often the raw image sensor data and the raw motion sensor data are not perfectly synchronized and may therefore require a synchronization correction. Some devices may have dedicated hardware lines for the purpose of synchronization. However, such hardware solutions are not always available. Accordingly, it would be desirable to provide methods and systems for the synchronization to be performed purely based on analysis of the sensor data. This disclosure satisfies these and other needs.

SUMMARY

As will be described in detail below, this disclosure includes a method for synchronizing data provided by an image sensor and a motion sensor rigidly linked together, comprising the steps of:
  obtaining image sensor data and motion sensor data;
  processing at least one of the image sensor data and the motion sensor data;
  extracting motion characteristics from filtering said processed data, wherein said
  filtering comprises at least applying a high pass filter; and
synchronizing the image sensor data and the motion sensor data provided by the rigidly linked sensors using synchronization data derived from identification of substantially similar motion characteristics in the filtered image sensor data and the filtered motion sensor data.

In an aspect of the present invention, the step of synchronizing is obtained by applying a correction based on the synchronization data to at least one of the image sensor data and the motion sensor data.

In a further aspect, the correction consists of applying a time delay to at least one of the image sensor data and the motion sensor data.

In a further aspect, the correction consists of modifying a time interval between at least two successive data samples from at least one of the image sensor data and the motion sensor data.

In a further aspect, the correction comprises an interpolation of one of the image sensor data and the motion sensor data.

In a further aspect, the image sensor data and the motion sensor data comprise timestamp data, and wherein the step of synchronizing consists in modifying the timestamp data for at least one of the image sensor data and the motion sensor data.

In a further aspect, the synchronization data is derived using a pattern matching of the motion characteristics of the image sensor data and the motion sensor data.

In a still further aspect, the motion sensor has a plurality of measuring axes, and the step of processing processes the motion sensor data for determining a motion vector.

In a still further aspect, the method further comprises the step of determining a norm of the motion vector.

In a further aspect, the image sensor produces a plurality of image frames, and the step of processing of the image sensor data comprises determining displacement data related to points of interest in the image derived from a comparison of at least two image frames.

In a further aspect, a motion vector is derived based on the displacement data.

This disclosure also includes a sensor synchronization unit, comprising an image sensor and a motion sensor rigidly linked together, configured to:
  obtain image data from the image sensor;
  obtain motion data from the motion sensor;
  process at least one of the image sensor data and the motion sensor data; and extract motion characteristics from filtering said processed data, wherein said filtering comprises at least applying a high pass filter; and
  synchronize the image sensor data and the motion sensor data provided by the rigidly linked sensors using synchronization data derived from identification of substantially similar motion characteristics in the filtered image sensor data and the filtered motion sensor data.

In a further aspect, the sensor synchronization unit is further configured to provide the synchronized data to an image stabilization system.

Further, this disclosure includes a system for synchronizing image sensor data and motion sensor data, comprising:
  an image sensor;
  a motion sensor rigidly linked to the image sensor; and
  a processor configure to:
    obtain image data from the image sensor;
    obtain motion data from the motion sensor;
    process at least one of the image sensor data and the motion sensor data;
    filter the processed data wherein said filtering comprises applying a high-pass filter, and;
    synchronize the image sensor data and the motion sensor data provided by the rigidly linked sensors using synchronization data derived from identification of substantially similar motion characteristics in the filtered image sensor data and the filtered motion sensor data.

DETAILED DESCRIPTION

Figure 1:
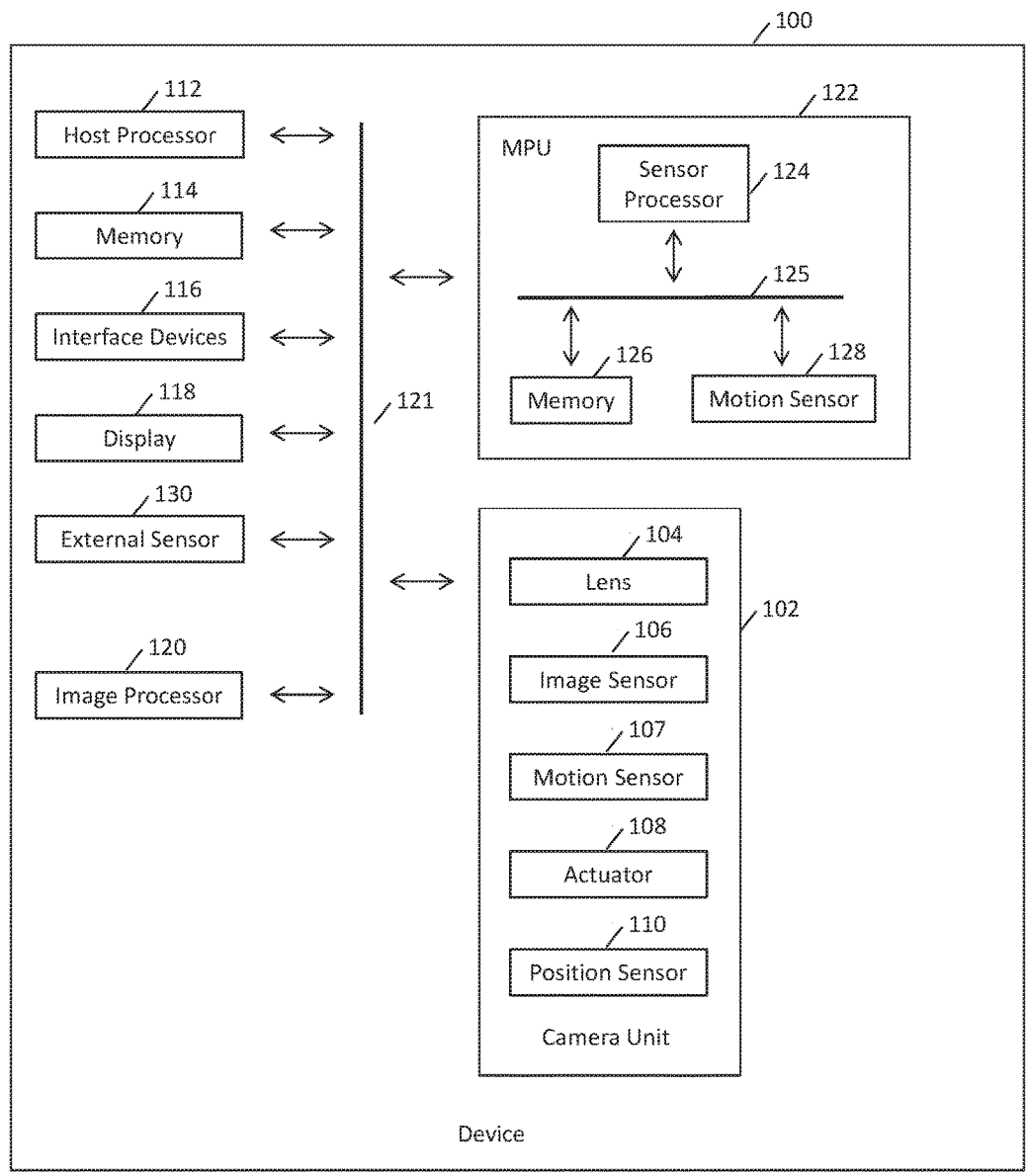
FIG. 1 is a schematic diagram of a device configured to synchronize sensor data according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a", "an" and "the" include plural referents unless the content clearly dictates otherwise.

As noted above, for image stabilization using motion sensors it is important that the image data and the motion data are perfectly synchronized. Techniques exist where the synchronization is performed using, for example, dedicated hardware lines for time stamping of the image data and/or motion data. However, if these techniques are not available, synchronization may be done by analyzing the image data and the motion data, deducing specific characteristic in both data, and performing a time alignment of the characteristics in the image data and the motion data. A requirement to obtain a correct synchronization based on the time alignment of the characteristics is that the image sensor and the motion sensor are rigidly linked so that they that both experience the same motions at substantially equal times.

To help illustrate these and other aspects of the disclosure, details regarding one embodiment of a mobile electronic device 100 are depicted as high level schematic blocks in FIG. 1. As will be appreciated, device 100 may be implemented as a device or apparatus, such as a handheld device that can be moved in space by a user and its motion and/or orientation in space therefore sensed. For example, such a handheld device may be a mobile phone (e.g., cellular phone, a phone running on a local network, or any other telephone handset), wired telephone (e.g., a phone attached by a wire), personal digital assistant (PDA), video game player, video game controller, navigation device, activity or fitness tracker device (e.g., bracelet or clip), smart watch, other wearable device, mobile internet device (MID), personal navigation device (PND), digital still camera, digital video camera, binoculars, telephoto lens, portable music, video, or media player, remote control, or other handheld device, or a combination of one or more of these devices.

Device 100 includes a camera unit 102 configured for capturing images. The camera unit 102 includes at least an optical element, such as, for example, a lens 104, which projects the image onto an image sensor 106. The camera unit 102 may optionally be apt to perform optical image stabilization (OIS). Typically, OIS systems include processing to determine compensatory motion of the lens in response to sensed motion of the device or part of the device, such as e.g. the camera (body), actuators to provide the compensatory motion in the image sensor or lens, and position sensors to determine whether the actuators have produced the desired movement. The camera unit 102 may include dedicated motion sensors 107 to determine the motion, or may obtain the motion from another module in the device, such as e.g. the Motion Processing Unit (MPU) 122. In an embodiment that features OIS, the camera unit includes an actuator 108 for imparting relative movement between lens 104 and image sensor 106 along at least two orthogonal axes. Additionally, a position sensor 110 may be included for determining the position of lens 104 in relation to image sensor 106. Motion sensing may be performed by a general purpose sensor assembly as described below according to techniques disclosed in co-pending, commonly owned U.S. patent application Ser. No. 14/524,807, filed Oct. 27, 2014, which is hereby incorporated by reference in its entirety. In one aspect, actuator 108 may be implemented using voice coil motors (VCM) and position sensor 110 may be implemented with Hall sensors, although other suitable alternatives may be employed.

Device 100 may also include a host processor 112, memory 114, interface device 116 and display 118. Host processor 112 can be one or more microprocessors, central processing units (CPUs), or other processors which run software programs, which may be stored in memory 114, associated with the functions of device 100. Interface devices 116 can be any of a variety of different devices providing input and/or output to a user, such as audio speakers, buttons, touch screen, joystick, slider, knob, printer, scanner, computer network I/O device, other connected peripherals and the like. Display 118 may be configured to output images viewable by the user and may function as a viewfinder for camera unit 102. Further, the embodiment shown features dedicated image processor 120 for receiving output from image sensor 106 as well as controlling the OIS system, although in other embodiments, any distribution of these functionalities may be provided between host processor 112 and other processing resources of device 100. For example, camera unit 102 may include a processor to analyze the motion sensor input and control the actuators. In another example, a sensor hub processor may communicate with the motion sensor and image sensor and perform some or all of the steps of the methods described here. Image processor 120 or other processing resources may also apply stabilization to the captured images as described below. The different component of device 100 may communicate over bus 121. In addition, dedicated communication lines between the different components of device 100 may also exist.

Accordingly, multiple layers of software can be provided in memory 114, which may be any combination of computer readable medium such as electronic memory or other storage medium such as hard disk, optical disk, etc., for use with the host processor 112. For example, an operating system layer can be provided for device 100 to control and manage system resources in real time, enable functions of application software and other layers, and interface application programs with other software and functions of device 100. Similarly, different software application programs such as menu navigation software, games, camera function control, image processing or adjusting, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 also includes a general purpose sensor assembly in the form of integrated Motion Processing Unit (MPU) 122 featuring sensor processor 124, memory 126 and motion sensor 128. The Motion Processing Unit may also be referred to as a Sensor Processing Unit (SPU), and may contain other types of sensors. Sensor processor 124, memory 126, and motion sensor 182 may communicate over sensor bus 125. Dedicated communication lines between the different components of MPU 122 may also exist. Memory 126 may store algorithms, routines or other instructions for processing data output by motion sensor 128 and/or other sensors as described below using logic or controllers of sensor processor 124, as well as storing raw data and/or motion data output by motion sensor 128 or other sensors. Motion sensor 128 may be a single sensor, or a sensor assembly comprising multiple sensors of the same or different type, for measuring motion of device 100 in space. Depending on the configuration, MPU 122 measures one or more axes of rotation and/or one or more axes of acceleration of the device. In one embodiment, at least some of the motion sensors are inertial sensors, such as rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, the gyroscopes and accelerometers may each have 3 orthogonal axes, such as to measure the motion of the device with 6 degrees of freedom. The signals from the sensors may be combined in a sensor fusion operation performed by sensor processor 124 or other processing resources of device 100, providing a six axis determination of motion, which may be expressed as a e.g. motion vector. The sensor information may be converted, for example, into an orientation, a change of orientation, a speed of motion, or a change in the speed of motion. The information may be deduced for one or more predefined axes, depending on the requirements of the system. As desired, motion sensor 128 may be implemented using MEMS to be integrated with MPU 122 in a single package. Exemplary details regarding suitable configurations of host processor 112 and MPU 122 may be found in co-pending, commonly owned U.S. patent application Ser. No. 11/774,488, filed Jul. 6, 2007, and Ser. No. 12/106,921, filed Apr. 21, 2008, which are hereby incorporated by reference in their entirety. Further, MPU 122 may be configured as a sensor hub by aggregating sensor data from additional processing layers as described in co-pending, commonly owned U.S. patent application Ser. No. 14/480,364, filed Sep. 8, 2014, which is also hereby incorporated by reference in its entirety. Suitable implementations for MPU 122 in device 100 are available from InvenSense, Inc. of San Jose, Calif. Thus, MPU 122 may be configured to provide motion data for purposes independent of camera unit 102, such as to host processor 112 for user interface functions, as well as enabling OIS functionality. Any, or all parts of the MPU may be combined with image processor 120 into a single chip or single package, and may be integrated into the camera unit 102. Any processing or processor needed for the actuator 108 control or position sensor 110 control, may also be included in the same chip or package.

Device 100 may also include other sensors as desired, such as e.g. external sensor 130. The term external refers to the sensor being external to the MPU (or SPU) 122 and may be incorporated in device 100, or connect to device 100. Motion sensor 128, or other sensors incorporated in MPU 122 may also be referred to as internal sensors. Any internal sensors 128 or external sensors 130 may provide additional sensor data about the environment surrounding device 100. For example, sensors such as one or more pressure sensors, magnetometers, temperature sensors, infrared sensors, ultrasonic sensors, radio frequency sensors, position sensors such as GPS, or other types of sensors can be provided. In one embodiment, data from a magnetometer measuring along three orthogonal axes may be fused with gyroscope and accelerometer data to provide a nine axis determination of motion. Further, a pressure sensor may be used as an indication of altitude for device 100, such that a sensor fusion operation may provide a ten axis determination of motion.

In the embodiment shown, camera unit 102, MPU 122, host processor 112, memory 114 and other components of device 100 may be coupled through bus 121, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 112 and memory 114. Similarly, additional buses may be used to couple the various components of MPU 122.

As noted above, multiple layers of software may be employed as desired and stored in any combination of memory 114, memory 126, or other suitable location. For example, a motion algorithm layer can provide motion algorithms that provide lower-level processing for raw sensor data provided from the motion sensors and other sensors. A sensor device driver layer may provide a software interface to the hardware sensors of device 100. Further, a suitable application program interface (API) may be provided to facilitate communication between host processor 112 and MPU 122, for example, to transmit desired sensor processing tasks. Other embodiments may feature any desired division of processing between MPU 122 and host processor 112 as appropriate for the applications and/or hardware being employed. For example, lower level software layers may be provided in MPU 122 and an API layer implemented by host processor 112 may allow communication of the states of application programs as well as sensor commands. Some embodiments of API implementations in a motion detecting device are described in co-pending U.S. patent application Ser. No. 12/106,921, incorporated by reference above.

In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. MEMS cap provides mechanical support for the MEMS structure. The MEMS structural layer is attached to the MEMS cap. The MEMS cap is also referred to as handle substrate or handle wafer. In the described embodiments, an MPU may incorporate the sensor. The sensor or sensors may be formed on a first substrate. Other embodiments may include solid-state sensors or any other type of sensors. The electronic circuits in the MPU receive measurement outputs from the one or more sensors. In some embodiments, the electronic circuits process the sensor data. The electronic circuits may be implemented on a second silicon substrate. In some embodiments, the first substrate may be vertically stacked, attached and electrically connected to the second substrate in a single semiconductor chip, while in other embodiments the first substrate may be disposed laterally and electrically connected to the second substrate in a single semiconductor package.

As one example, the first substrate may be attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economic package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Depending on the context, motion data may refer to raw data or processed raw data, which may involve applying a sensor fusion algorithm or applying any other algorithm. In the case of a sensor fusion algorithm, data from one or more sensors may be combined to provide an orientation or orientation change of the device, or a motion vector derived from the orientation (change). In the described embodiments, an MPU may include processors, memory, control logic and sensors among structures.

As noted above, a raw video stream comprising a plurality of images captured by camera unit 102 may be shaky due to unintended movements of device 100. A variety of stabilization techniques may be applied to obtain a stabilized video stream. In one aspect, the stabilization technique may involve OIS as described above to generate a compensating relative movement between image sensor 106 and lens 104 in response to detected movement of device 100. In this case the raw video stream captured by the image sensor has been stabilized already due to the motion of the lens. This allows compensation for small movements of the camera and is limited by the displacement limitations of the actuators. In another aspect, the stabilization technique may involve processing operations known in the art as electronic image stabilization (EIS), where the image sensor records the raw video stream without any prior (optical) stabilization. As known in the art, this may be an image processing technique where at least two captured images are employed with one serving as a reference. By comparing the second image, it may be determined whether one or more pixels have been translated or "shifted". To the extent such translation is due to unintended motion of device 100, the second image may be adjusted to generate a stabilized image that minimizes the amount the one or more pixels are shifted or displaced, since in the absence of intended movement of the camera and movement of objects in the scene, the pixels should be identical (neglecting camera sensor noise). Alternatively, or in addition, the stabilization may be based on the motion detected by a suitable sensor assembly, such as MPU 122, while an image is being captured. Accordingly, the motion data may be used to determine the shift or displacement between the first and second image, and to adjust the captured image by shifting the pixels by an amount that compensates for the detected motion to generate a stabilized image. As desired, one or any combination of these and other techniques may be used to stabilize the raw video stream.

As noted above, the image stabilization requires that the image data and the motion data are perfectly synchronized. The methods discussed below allow the synchronization to be performed through analysis of the image data and motion data. The image data may refer to a sequence of captured images, and the motion data may refer to the raw data from one or more motion sensors, or to processed motion data, for example after fusion of several motion sensors. The methods may be applied to device 100 as shown in FIG. 1, and may be executed by one of the incorporated processors. The methods may be applied in real time, or with a delay ('offline'). The image sensor and the motion sensors must be rigidly linked together so that both sensors experience the motion imparted to the device at substantially the same time. For example, if FIG. 1 represents a smartphone, or any other mobile device, the internal architecture of the mobile device is most often a structure where the components are rigidly connect together and/or to the casing of the device. When the motion sensor and the image sensor are rigidly linked, the motion sensor senses the motion that the image sensor experiences. In embodiments, where the link is not perfectly rigid, the methods of this invention may still be applied if a mechanical transfer function is known, which converts the motion detected by the motion sensor to the motion experienced by the image sensor. The link between the motion sensor and image sensor may absorb some mechanical vibrations, but as long as sufficient vibrations experienced by the image sensor are transferred to the motion sensor to be detected, the methods discussed below may be applied.

Figure 2:
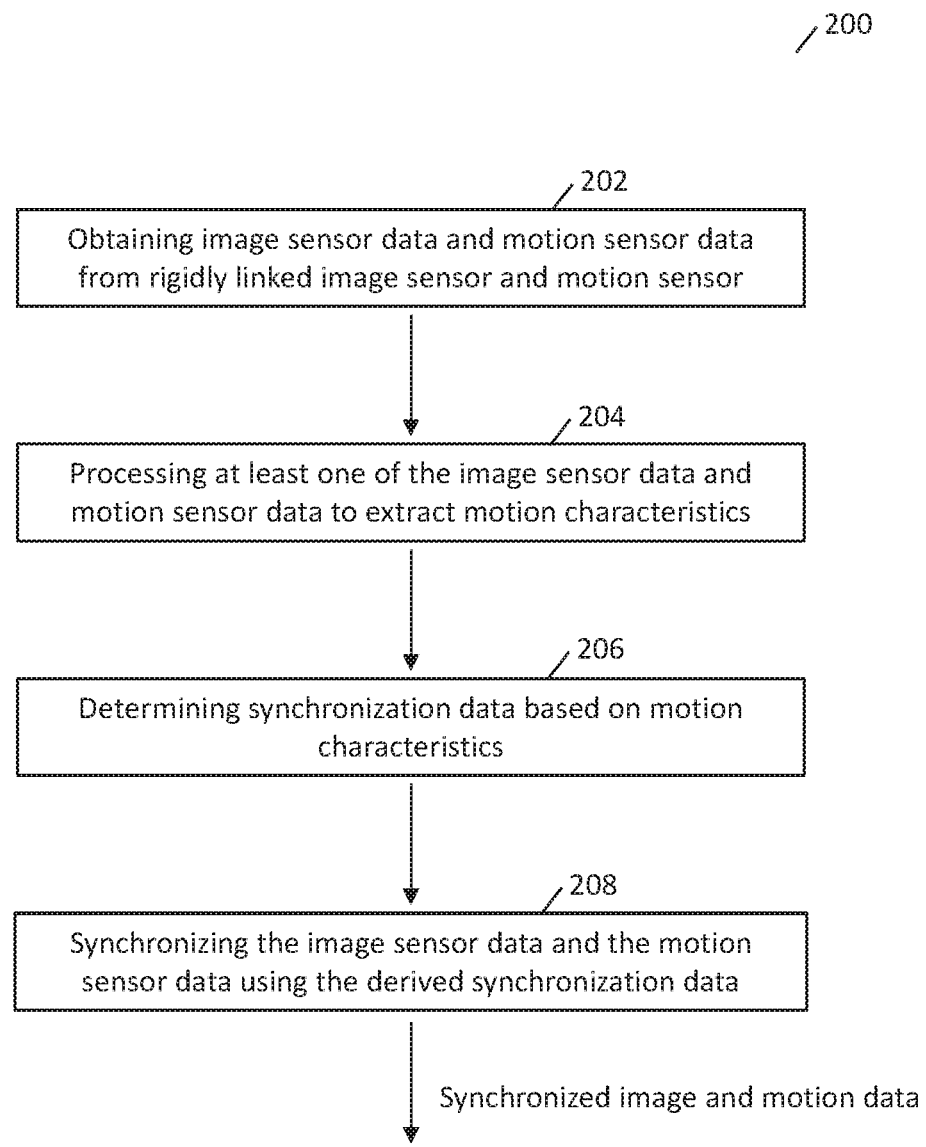
FIG. 2 is a schematic diagram illustrating the synchronization of image sensor data and motion sensor data according to an embodiment.

An example of such a method is shown in FIG. 2, which shows the different steps involved. The first step 202 of method 200 is to obtain the image sensor data and the motion sensor data. The analysis of the image sensor data and the motion sensor data requires a plurality of image frames and motion sensor samples. The generation of the data samples may be based on an identical clock, such as e.g. a system clock, or at least one of the image sensor and the motion sensor may have a dedicated (integrated) clock. The data may be stored or buffered in any available memory, such as e.g. memory 114, memory 126, or a dedicated memory with camera unit 102 or with image processor 120. The timespans of the image sensor data and the motion sensor data may be identical or may differ, as long as sufficient samples are available for the analysis. The data may be raw sensor data, or may already have been processed. For example, motion data may represent raw accelerometer data, but may also be represented by orientation data derived through data fusion using multiple sensors. The orientation data may be expressed as orientation vectors, motion vectors, rotation matrices, Euler angles, quaternions, and the like.

The obtained image sensor data and the motion sensor data is then processed in step 204 to extract the motion characteristics. A frequency filter may be used for the motion data to extract the motion characteristics, for example a band pass filter or a high pass filter. For the image data, the motion characteristics may be derived by comparing a first image with at least a second image. Some image analysis techniques may be involved. For example, imaging techniques may be used to determine one or more points of interest or features points. By comparing the location of these points in the different images, the displacement data of these points may be determined, from which the motion characteristics may be derived. The motion characteristics may be expressed as a motion vector, a homography or any other type of matrix that expresses the conversion from one image to another. The image data may also further undergo some sort of frequency filtering as discussed in relation to the motion data. The motion characteristics of the image sensor data and the motion sensor data may be expressed as relative rotations and/or translations with respect to a predefined reference frame, such as e.g. the earth's reference frame. Alternatively, an arbitrary reference orientation of the device may be selected. Both the image sensor data and the motion sensor data may be with respect to the same reference frame, or they may each have their own reference frame. For an optimal analysis the image sensor data and the motion sensor data have the same amount of degrees of freedom, but even if this is not the same the synchronization may still be possible.

The motion of the mobile device may comprise intended and unintended motion. During the recording of the image frames, i.e. recording of video, the user may e.g. pan the camera, which represents intended motion. An example of unintended motion may be the vibrations or jitter due to shaking motion of the hands of the user. In many situations, frequency filtering may be used to separate the intended and the unintended motion because the unintended motion usually has a higher frequency. The unintended vibrations mentioned here may be caused directly or indirectly by the user holding the device, or e.g. mounting a camera on a helmet. The vibrations may also be due to the object that the camera may be mounted to, such as e.g. a car. A more detailed discussion on the separation of intended and unintended motion is disclosed in co-pending, commonly owned U.S. patent application Ser. No. 14/718,819, filed May 21, 2015, which is hereby incorporated by reference in its entirety.

During one or more of steps 202 and 204, a check or validation may be performed if the image sensor data and or motion sensor data gives relevant or meaningful data. If this is not the case, the next steps may not be executed because they may not give any relevant or accurate results. This would save computing and power resources. For example, if the motion sensor data does not containing any useable motion characteristics, the extraction of the synchronization data may be interrupted until such data becomes available. Similarly, if the images do not allow the extracted of e.g. points of interest, for example due to too much blurring, the motion characteristics may not be determined, and the processes may be interrupted. As such, method 200 may comprise an additional validation step to verify the presence of motion characteristics according to predefined criteria.

The output of step 204 comprises two sets of motion characteristics data: a first set of motion characteristics data derived from the motion sensor data, and a second set of motion characteristics data derived from the image sensor data. This output is used in next step 206 to derive the synchronization data based on a comparison of the two sets of motion characteristics data. This comparison may be based, for example, on pattern matching techniques such as e.g. Dynamic Time Warping (DTW), sliding correlation techniques etc. The goal is to identify substantially similar motion characteristics in both data sets and determine how the motion characteristics in one set relate to those in the other set. The motion characteristics in the different data sets may be shifted in time compared to each, but may also be extended or compressed in time. The synchronization data may be in many different forms, which may depend on the architecture of device 100. In one embodiment, the synchronization data may consist of a time delay, which expresses the time the image sensor data is delayed with respect to the motion sensor data, or vice-versa. This embodiment may apply to situations where the image sensor data and the motion sensor data have the same sample rate. In case the image sensor data and the motion sensor data do not have the same sample rate, the synchronization data may comprise a synchronization time function. In case the sample rates are different but constant, the synchronization time function may be a linear function. If the sample rates are not constant, due to imperfect or drifting sensor clocks, the synchronization time function may be non-linear. As such, based on the synchronization data, the time interval between at least two of the data samples may be modified.

In step 208, the synchronization data derived in previous step 206 is used to synchronize the image sensor data and the motion sensor data. The synchronization may consist of applying the correct time stamps to the image sensor data and the motion sensor data, or if time stamps already existed, modify the time stamps if required. Alternatively, one of the image sensor data and the motion sensor data may be resampled to match the timing of the other data. For example, the motion data may be interpolated to provide a motion sensor data, raw or processed, for the sample times of the image data. The synchronization module may receive settings or parameter information from the motion sensor or image sensor, for example related to data sample rates etc. Alternatively, this information may be comprised in the motion data or image data.

The processing required for the different steps of method 200 may be performed by a single processor, or distributed over different (dedicated) processors. In one embodiment, the image sensor data and the motion sensor data may be transferred to the host processor which does all the processing, In an alternative embodiment, the motion sensor data is send to image processor 120, or another processor in camera unit 102, which does all the processing. In some embodiments, sensor processor 124 may perform some of the processing required for the motion data, such as e.g. extracting the motion characteristics, and an image processor, such as image processor 120, may perform some of the processing required to extract the motion characteristics from the image data. The host processor, or a dedicated synchronization processor, may then receive the information related to the motion characteristics from the motion data and the image data, and perform the synchronization.

In some embodiments not all the step of method 200 are executed all the time, i.e. when each data sample is acquired. The timing differences between the image sensor data and the motion sensor data may be constant, or only vary slowly. In this case, the steps 204 and 206 to deduce the synchronization data may not be performed continuously at each data sample, but only once in a while, for example, at regular time intervals, or if the timing changes. This means that the first time method 200 is executed, all steps are performed in order to determine first synchronization data which is then used to synchronize the motion data and image data. During subsequent execution cycles the first synchronization data may be applied repetitively, therefore skipping steps 204 and 206. At regular time intervals, steps 204 and 206 are executed to see if the synchronization data is still substantially equal to the first synchronization data. If this is not the case, the new synchronization data is used for subsequent cycles. The second determination of the synchronization data may be calculated using the raw the uncorrected data, or may be performed on the already synchronized data. The latter means that the outcome of the synchronization analysis is the correction of the first synchronization data. During the first cycles the interval may be small, or even every cycle, and if the synchronization data does not change, the interval may be increased gradually. As such, the interval depends on the synchronization data and the change or variation of the synchronization data.

In some embodiments, the determined synchronization data may be communicated to one of the image sensor and the motion sensor so that the sensor, or associated sensor processor, can perform the required synchronization correction at sensor level. For example, if the synchronization analysis reveals that the motion sensor data should be delayed compared to the image sensor data, this delay may be communicated to the motion sensor, so that the delay can be applied directly to the raw sensor data. In other words, the synchronization correction is performed at the source. In a similar manner as mentioned above, a second synchronization analysis to the sensor data corrected at the source, may allow a correction of the applied synchronization, and an update of the synchronization data for the correction at the source.

The output of method 200 is synchronized image sensor data and motion sensor data. This synchronization data may then be used for different applications. In one example, the synchronization data is used for image stabilization, which may be performed by one or more of the available processors. An assessment of the quality of the stabilization may also be used to indicate if the synchronization data may need to be adapted, i.e. creating a feedback loop between the stabilization process and the process to determine the synchronization data.

In another embodiment, the synchronized data may be used for a validation and/or correction of one or more parameters of the motion sensors, for example the bias and sensitivity settings of a gyroscope. In this example, the high frequency component of the gyroscope signal is used for the synchronization process, which is uninfluenced by any possible bias or sensitivity errors. Once the image data and gyroscope data are synchronized, the image data may be used as a gold reference for the gyroscope to verify, and correct if needed, the gyroscope parameters.

The example embodiments discussed above are focused on the synchronization of image sensor data and motion sensor data to describe the methods and systems of the invention, but these applications should not be seen in any way as limiting the scope of the invention. The same methods may also be applied for the synchronization of a plurality of rigidly linked imaging units (e.g. camera), for example, for the creation of 3D images. Furthermore, the same methods may also be applied for the synchronization of different motion sensors, or motion sensor devices rigidly linked together. As such, the methods may be used to synchronize data from two or more different sensors that are rigidly linked together based on the alignment of substantially equal motion characteristics present in the data from the different sensors.

What is claimed is:

1. A method for synchronizing data provided by an image sensor and a motion sensor rigidly linked together, comprising the steps of:
   obtaining image sensor data and motion sensor data, wherein the image sensor data is unsynchronized and the motion sensor data is unsynchronized; and
   providing at least one processor configured to:
   a) process the motion sensor data;
   b) extract motion characteristics from the motion sensor data independently of the image sensor data by filtering said processed motion sensor data, wherein said filtering comprises at least applying a frequency filter;
   c) extract motion characteristics from the image sensor data independently of the motion sensor data; and
   d) synchronize the image sensor data and the motion sensor data provided by the rigidly linked sensors using synchronization data derived from matching the motion characteristics extracted from the image sensor data to the motion characteristics extracted from the motion sensor data and applying a correction based on the synchronization data to at least one of the image sensor data and the motion sensor data.

2. The method of claim 1, wherein the correction consists of applying a time delay to at least one of the image sensor data and the motion sensor data.

3. The method of claim 1, wherein the correction consists of modifying a time interval between at least two successive data samples from at least one of the image sensor data and the motion sensor data.

4. The method of claim 1, wherein the correction comprises an interpolation of one of the image sensor data and the motion sensor data.

5. The method of claim 1, wherein the image sensor data and the motion sensor data comprise timestamp data, and wherein the step of synchronizing consists in modifying the timestamp data for at least one of the image sensor data and the motion sensor data.

6. The method of claim 1, wherein the synchronization data is derived using a pattern matching of the motion characteristics of the image sensor data and the motion sensor data.

7. The method of claim 1, wherein the motion sensor has a plurality of measuring axes, and the step of processing processes the motion sensor data to determine a motion vector.

8. The method of claim 7, further comprising the step of determining a norm of the motion vector.

9. The method of claim 1, wherein the image sensor produces a plurality of image frames, and the step of processing of the image sensor data comprises determining displacement data related to points of interest in the image derived from a comparison of at least two image frames.

10. The method of claim 9, wherein a motion vector is derived based on the displacement data.

11. A sensor synchronization unit, comprising an image sensor and a motion sensor rigidly linked together, configured to:
    obtain image data from the image sensor, wherein the image sensor data is unsynchronized;
    obtain motion data from the motion sensor, wherein the motion sensor data is unsynchronized; and use at least one processor to:
- a) process the motion sensor data;
- b) extract motion characteristics from the motion sensor data independently of the image sensor data by filtering said processed motion sensor data, wherein said filtering comprises at least applying a frequency filter;
- c) extract motion characteristics from the image sensor data independently of the motion sensor data; and
- d) synchronize the image sensor data and the motion sensor data provided by the rigidly linked sensors using synchronization data derived from matching the motion characteristics extracted from the image sensor data to the motion characteristics extracted from the motion sensor data and applying a correction based on the synchronization data to at least one of the image sensor data and the motion sensor data.

12. The sensor synchronization unit of claim 11, further configured to provide the synchronized data to an image stabilization system.

13. A system for synchronizing image sensor data and motion sensor data, comprising:
- an image sensor;
- a motion sensor rigidly linked to the image sensor; and
- at least one processor configured to:
  - obtain image data from the image sensor, wherein the image sensor data is unsynchronized;
  - obtain motion data from the motion sensor, wherein the motion sensor data is unsynchronized;
  - process the motion sensor data;
  - filter the processed data, wherein said filtering comprises applying frequency filter;
  - extract motion characteristics from the motion sensor data independently of the image sensor data by filtering said processed motion sensor data;
  - extract motion characteristics from the image sensor data independently of the motion sensor data; and
  - synchronize the image sensor data and the motion sensor data provided by the rigidly linked sensors using synchronization data derived by matching the motion characteristics extracted from the image sensor data to the motion characteristics extracted from the motion sensor data and applying a correction based on the synchronization data to at least one of the image sensor data and the motion sensor data.

14. The system of claim 13, further comprising a memory for buffering at least one of the image sensor data and the motion sensor data.

15. The system of claim 13, wherein the motion sensor comprises a gyroscope.

16. The system of claim 13, wherein the motion sensor comprises a gyroscope and an accelerometer, and the motion data is based on an orientation determined based on fusion of at least the gyroscope data and accelerometer data.

* * * * *